United States Patent
Farrell

(10) Patent No.: US 8,952,557 B2
(45) Date of Patent: Feb. 10, 2015

(54) TURBINE APPARATUS AND METHOD FOR ENERGY RECLAMATION AND GENERATION OF ELECTRICAL POWER FROM FORCED-AIR SYSTEMS

(76) Inventor: Thomas W. Farrell, Rollingwood, TX (US)

(*) Notice: Subject to any disclaimer, the term of this patent is extended or adjusted under 35 U.S.C. 154(b) by 362 days.

(21) Appl. No.: 12/709,857

(22) Filed: Feb. 22, 2010

(65) Prior Publication Data

US 2011/0204646 A1     Aug. 25, 2011

(51) Int. Cl.
*F03D 9/00* (2006.01)
*H02P 9/04* (2006.01)

(52) U.S. Cl.
CPC ........... *F03D 9/003* (2013.01); *F05B 2220/604* (2013.01); *Y02E 10/72* (2013.01)
USPC ........................................................ 290/44

(58) Field of Classification Search
CPC ... F03D 9/003; Y02E 10/72; F05B 2220/604; F05B 13/00; F05B 17/04
USPC ............................ 290/43, 44, 54, 55; 415/916
See application file for complete search history.

(56) References Cited

U.S. PATENT DOCUMENTS 7,868,476 B2 *   1/2011   Baca et al. ....................... 290/55

FOREIGN PATENT DOCUMENTS

JP       2008094189        *   4/2008

OTHER PUBLICATIONS

Attachment 2, Machine translation of JP 2008 094189, Jun. 2, 2014.*
Attachment 1, English abstract, Jun. 2, 2014.*

* cited by examiner

Primary Examiner — Javaid Nasri
(74) Attorney, Agent, or Firm — Davis & Associates; William D. Davis

(57) ABSTRACT

A forced-air electric generator apparatus includes a housing positioned to receive forced-air flow from a forced-air device. A bladed rotor carried by the housing is in fluid communication with the forced air flow. A clutch engages the bladed rotor to drive a generator to produce a generated voltage when the bladed rotor is rotating above a threshold rotational velocity.

20 Claims, 5 Drawing Sheets

US 8,952,557 B2

TURBINE APPARATUS AND METHOD FOR ENERGY RECLAMATION AND GENERATION OF ELECTRICAL POWER FROM FORCED-AIR SYSTEMS

TECHNICAL FIELD

This invention relates to the field of power generation. In particular, this invention is drawn to generation of electrical power from forced-air systems.

BACKGROUND

Traditional power generation relies on hydroelectric, nuclear, or fossil fuels sources such as coal, oil, gas, and other hydrocarbon-based sources. Fossil fuel sources are recognized as being non-renewable sources that are being depleted over time. Federal, state, and local governments have developed various incentives to encourage the development of power generation from renewable or non-hydrocarbon based energy sources.

"Renewable" energy sources include solar, wind, geothermal, hydroelectric, wave and tidal energy, biomass, and biomass-based waste products, including landfill gas. Photovoltaic cells and heat engines are examples of devices for generating power from renewable energy sources.

These various sources are not uniformly available. Thus cost effective local generation of electrical power from wave and tidal energy, for example, can typically only be performed in coastal areas. Hydroelectric production is relegated in application to areas with flowing water (e.g., water reservoir with controlled flow release such as a dam or a river). Geothermal activity and wind-based production similarly depend upon the inherent geologic structures or climatic conditions. Most of the "renewable" solutions require significant infrastructure and cost or significant space that often renders them unsuitable for production in higher density urban areas.

SUMMARY

A forced-air electric generator apparatus includes a housing positioned to receive forced-air flow from a forced-air device. A bladed rotor carried by the housing is in fluid communication with the forced air flow. A generator is provided for converting mechanical energy to electrical energy. A clutch engages the bladed rotor to drive a generator to produce a generated voltage when the bladed rotor is rotating above a threshold rotational velocity.

A method of generating electricity includes positioning a turbine in fluid communication with a forced-air flow from a forced-air device. A clutch mechanically coupling the turbine to a generator is engaged to enable the turbine to drive the generator to produce a generated voltage when the rotational velocity of a bladed rotor of the turbine exceeds a pre-determined velocity.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
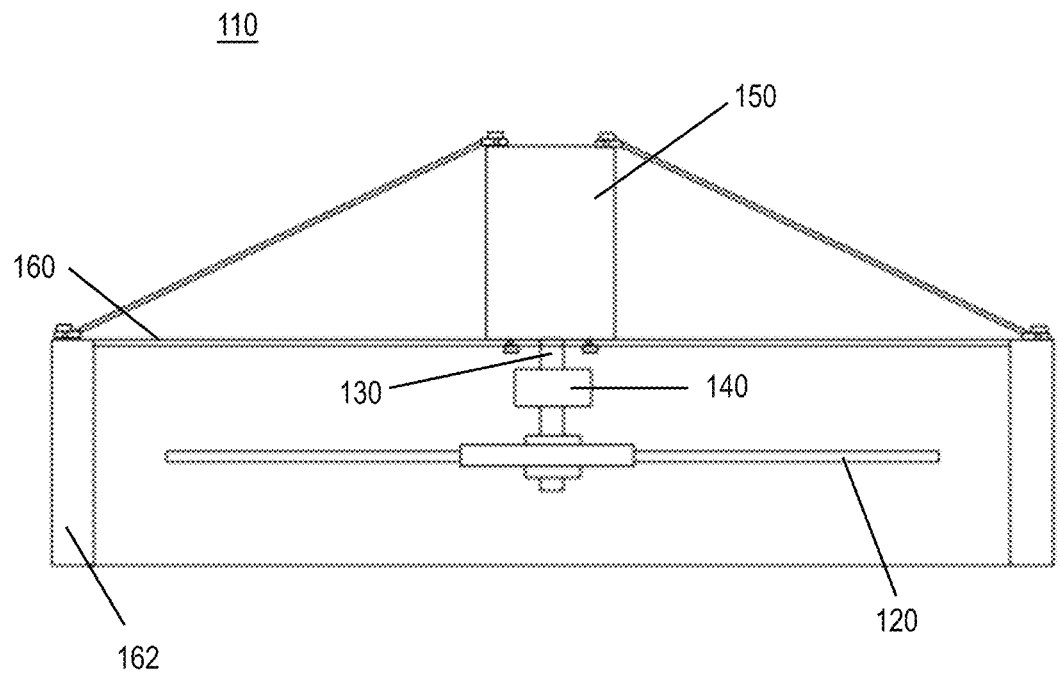
FIG. 1 illustrates one embodiment of a forced-air electric generator.

Mandatory and voluntary markets have been created to provide electrical power generated from sources other than traditional fossil fuel sources. These markets provide an opportunity for consumers to select electrical service providers based at least in part upon the source of the generated power. In addition, these markets are creating opportunities for consumers to generate power for their own use or for resale by the electric service provider in order to accommodate source demands.

Mandatory markets are implemented by law and regulatory constraints (e.g., renewable portfolio standards which may be established by state law or state utility commissions). These laws and regulatory constraints require electric service providers to have a minimum amount of renewable energy in their electricity supply. The portfolio standards often specify eligible energy resources and describe how electricity service providers must comply.

Voluntary markets have risen due to consumer demands for electrical power generation approaches that can reduce the environmental impact of consumer's electricity use.

In order to facilitate the growth of voluntary markets, various governmental entities are subsidizing either the purchase or the creation of power generated for example from solar, wind, geothermal, hydroelectric, wave and tidal energy, biomass, and biomass-based waste products including landfill gas. Generally, there are financial incentives to find and locate alternative sources of electrical power generation that do not rely upon traditional fossil fuel resources such as coal, oil, or natural gas.

These various sources of renewable energy are not uniformly available. Cost effective local generation of electrical power from wave and tidal energy, for example, can typically only be performed in coastal areas. Hydroelectric production is relegated in application to areas with flowing water (e.g., water reservoir with controlled flow release such as a dam or a river). Geothermal activity and wind-based production similarly depend upon the inherent geologic structures or climatic conditions of the geographic location. Most of the "renewable" solutions require significant infrastructure and cost or significant space that often renders them unsuitable for production in higher density urban areas. Opportunities to produce electricity through recovery of otherwise wasted resources are overlooked. Such recovery may be perceived as a "renewable energy" source in some senses due to the expected waste that is anticipated to continue into the indefinite future.

One such opportunity is to produce electricity by recovering the kinetic energy from exhaust air expelled in existing air conditioning system. Such air conditioning systems are ubiquitous throughout much of the United States and they are accessible on a very local level. Often there are one or more such systems per residence, premise, or building. Similar systems exist for commercial applications at the premise or building level and typically differ only in scale.

These air conditioning systems typically employ a forced-air convection system for cooling air conditioner compressors. The compressor cooling system is located external to the building where the conditioned air is delivered. The forced-air convection coolers utilize single speed fans which are either only "on" or "off". When "on", air is pumped at a high flow rate across the compressor for cooling.

The kinetic energy of the air forcibly exhausted by the cooling fans may be captured by a forced-air turbine. A turbine converts the kinetic energy of a fluid into mechanical energy by causing a bladed rotor to rotate. The fluid is the gaseous air and the kinetic energy of the gaseous air is carried by the forced-air flow. A generator coupled to the turbine converts the mechanical energy into electrical energy. The forced-air electric generator produces electricity from reclamation and conversion of kinetic energy.

One embodiment of a forced-air electric generator apparatus 110 is illustrated in FIG. 1. The apparatus includes a generator 150 for converting mechanical energy into electrical energy. The generator is driven by a bladed rotor 120. A housing 160 provides support for the bladed rotor and generator. The housing includes attachment points 162 for attaching the housing to a heat pump, air conditioning unit, or other source of forced exhaust air. The bladed rotor may be coupled to the generator by a clutch 140. The clutch engages the bladed rotor to the generator drive shaft 130 when the bladed rotor is rotating above a threshold rotational velocity.

Figure 2:
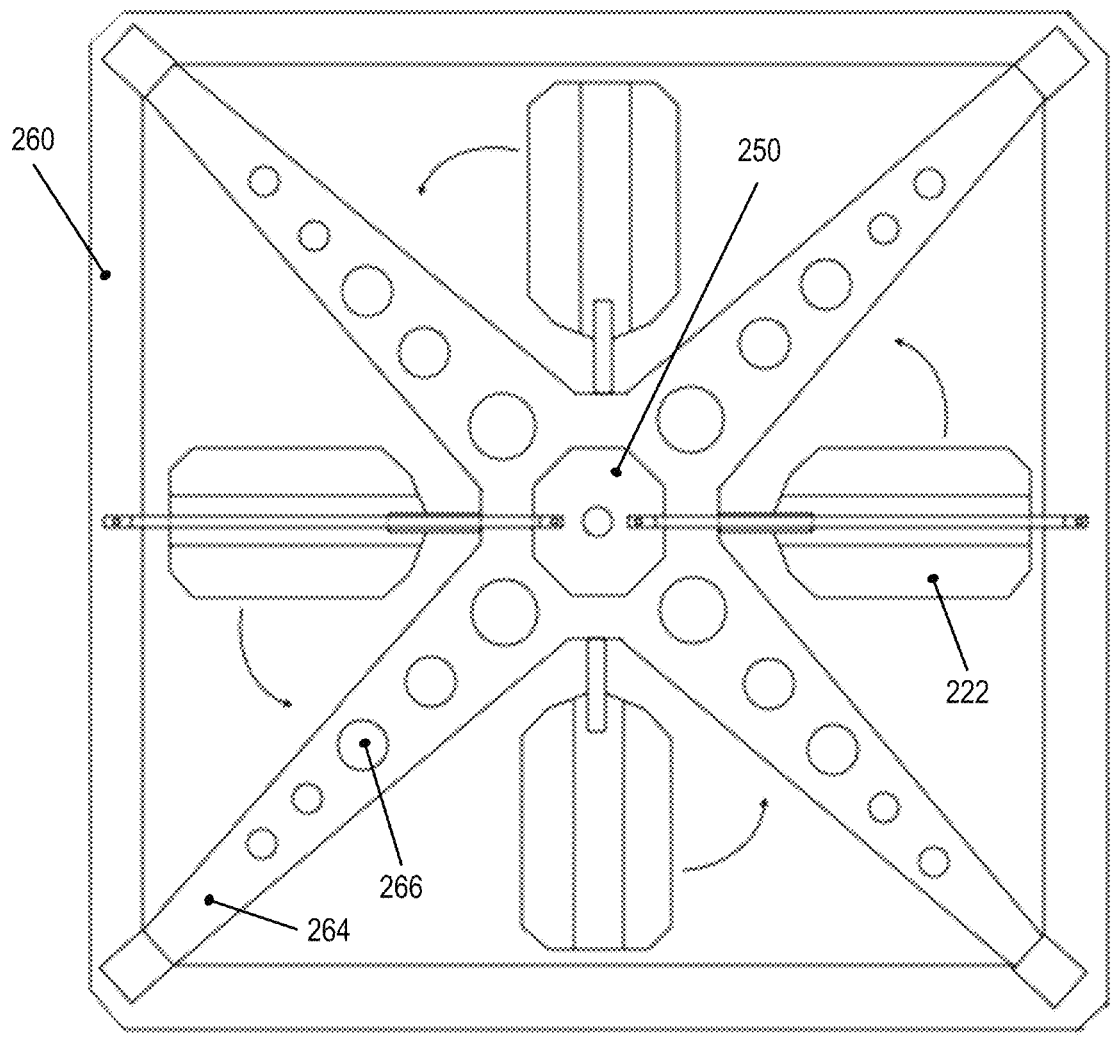
FIG. 2 illustrates a top view of one embodiment of a forced-air electric generator.

FIG. 2 illustrates a top view of one embodiment of the forced-air electric generator apparatus 210. In the illustrated embodiment the frame 260 has a rectangular cross-section in order to accommodate heat pumps, air conditioning units or other sources of exhaust air having a rectangular enclosures. In other embodiments, the cross section may be circular, oval, or otherwise shaped to accommodate the shape of the exhaust air source enclosure.

The forced-air exhaust source has an exhaust fan used to pull air across a compressor or other device for cooling purposes. Generally, the exhaust fans are not variable rate fans. They are either "on" or "off". The exhaust fan is thus being driven at a fixed speed or not at all.

Although the housing may have features to collect and re-direct the forced air in order to obtain greater flow velocities or pressures for capture by the bladed rotor, the housing is designed to avoid unduly burdening the forced-air device through the creation of back pressure. In the illustrated embodiment, the housing includes arms 264 to support the generator 250 and ultimately the bladed rotor above the forced-air device. Features such as pressure relief aperture 266 may be incorporated to facilitate air movement through the forced-air electric generator apparatus. The illustrated bladed rotor has four blades 222. In alternative designs, the bladed rotor may comprise a different plurality of blades or a single blade. Although illustrated as "paddles" for purposes of discussion, the blades may be of a design more suited to being driven by the forced air flow. Other characteristics such as blade pitch, width, length, and general shape may thus be varied as desired to meet the objectives of electricity production given the expected characteristics of the forced-air flow (e.g., speed, on/off frequency, etc.)

Figure 3:
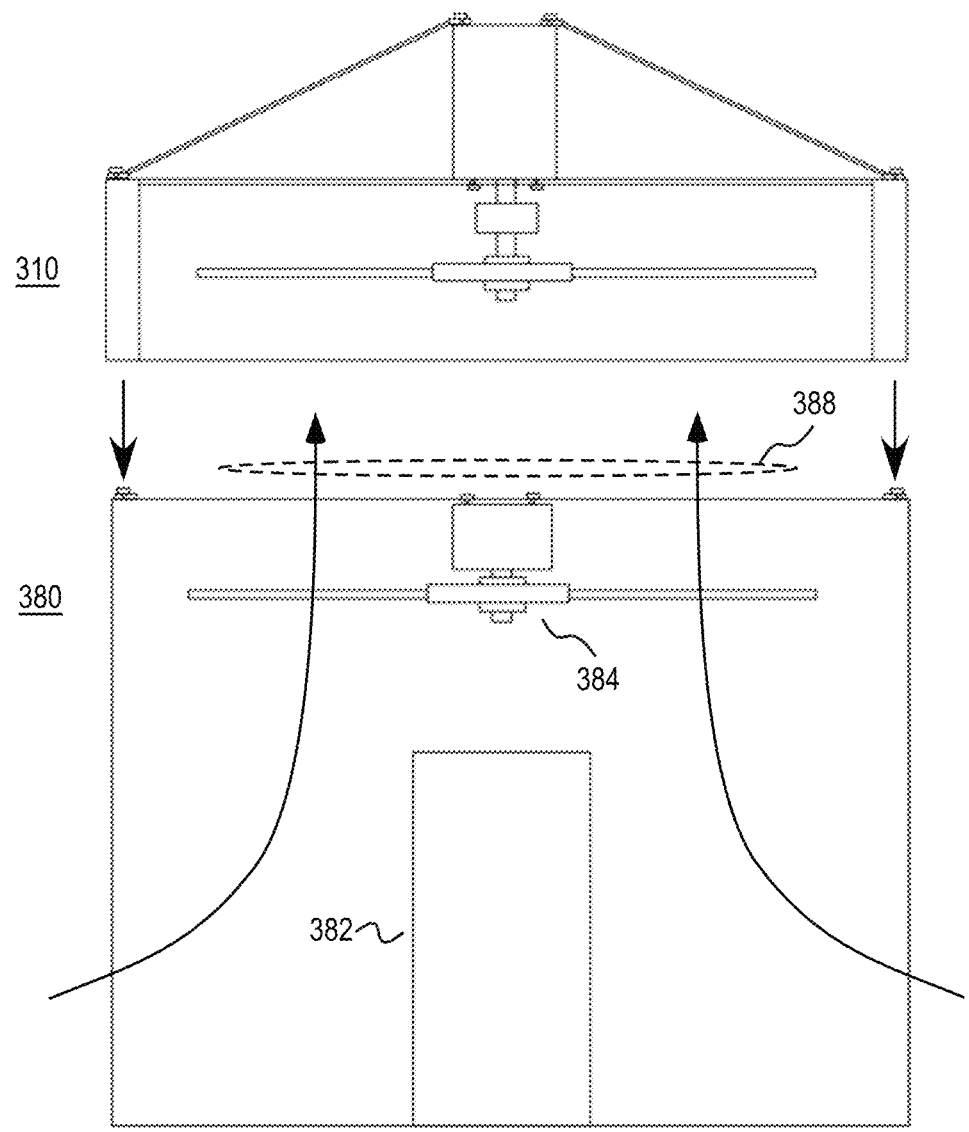
FIG. 3 illustrates forced-air exhaust driving the forced-air electric generator.

FIG. 3 illustrates one embodiment of a vertical cross-section of the forced-air electric generator 310 positioned with respect to a forced-air device 380. In the illustrated embodiment, the forced-air device is a convective cooling fan 384 for an air conditioner compressor 382. The convective cooling fan draws air through the enclosure across the air conditioner compressor and forcibly expels the air from the enclosure. The convective cooling fan thus pumps air to generate forced-air flow 388.

The forced-air electric generator 310 is positioned to ensure that the bladed rotor 320 is in fluid communication with the forced-air flow 388 from the forced-air device. When the convective cooling fan 384 is pumping air to create forced-air flow, the forced-air flow drives the bladed rotor 320 of the forced-air electric generator. The bladed rotor forms a turbine that converts the kinetic energy of the forced-air flow into mechanical energy.

When the bladed rotor is rotating above a threshold velocity, a clutch engages the turbine to drive the generator 350. The generator converts the mechanical energy from the turbine into electrical energy. The generator produces a generated voltage. In alternative embodiments the clutch is dispensed with such that the turbine is always engaged to drive the generator.

In one embodiment, the generated voltage is conditioned to create linefeed compatible voltage. The particular approach for conditioning depends upon the characteristics of the generated voltage and the characteristics needed for linefeed compatibility.

In the event that the generator produces a d.c. voltage and the linefeed compatibility requires an a.c. voltage, for example, an inverter can be used to transform the generated voltage into an a.c. voltage having approximately a same magnitude as a linefeed supply. In one embodiment, for example, the linefeed compatible voltage has approximately a same magnitude as a linefeed supply provided to power the forced-air cooling device.

For a.c. linefeed compatibility, some synchronization with a linefeed supply may be required. In one embodiment, the generated voltage is transformed such that the linefeed compatible voltage has a pre-determined phase relationship with a linefeed supply provided to power the forced-air device. In various embodiments, the linefeed compatible voltage leads or lags the linefeed supply voltage in phase. In one embodiment, the pre-determined phase relationship is substantially zero degrees.

Figure 4:
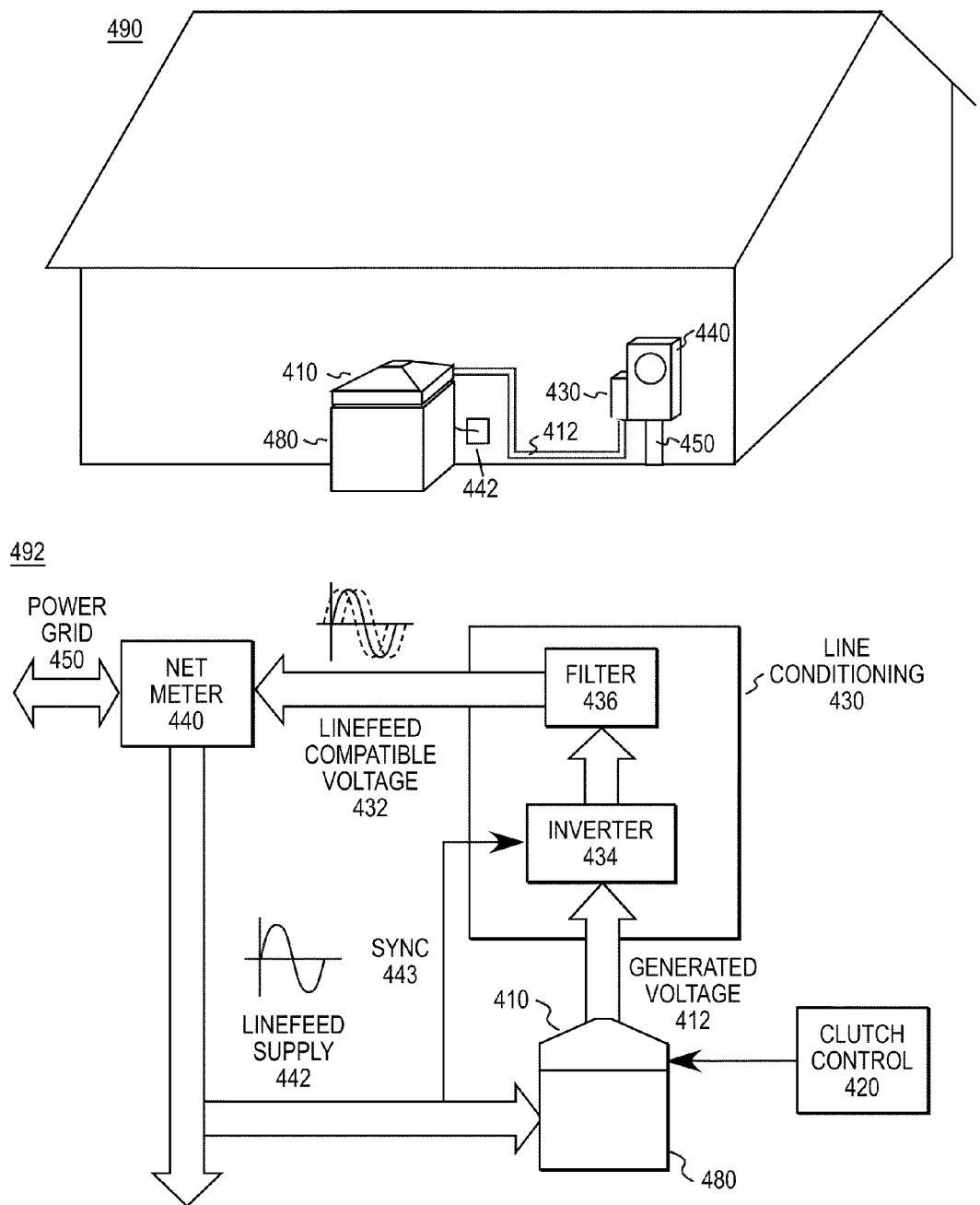
FIG. 4 illustrates one embodiment of a forced-air electric generator system.

FIG. 4 illustrates one embodiment of an electrical schematic 492 for a physical installation of the forced-air electric generator 410 at a residential structure 490. The net meter 440 is coupled to meter power consumption from a power grid. In the illustrated embodiment, the power grid supply 450 is provided by underground transmission lines.

The forced-air device 480 is a cooling system. The forced-air electric generator 410 is positioned for fluid communication with forced air expelled by the forced-air device. The forced-air device is powered by a linefeed supply 442 downstream from the net meter. The linefeed supply is provided in accordance with control signals from a climate control system that regulates air temperature and other environmental variables within the house 490.

Typically the forced-air device is only "on" or "off" with brief transitions in volumetric air flow around state transitions. In one embodiment, the forced-air electric generator includes a clutch control 420 for engaging the turbine to drive the generator. Although not illustrated in detail, in one embodiment the clutch control includes a sensor, processor, battery, and actuator. The processor interprets signals sensed by the sensor to determine whether the turbine is rotating above a pre-determined threshold velocity. The processor controls the actuator to engage or disengage the turbine from driving the generator. In various embodiments the processor is a microcontroller. The processor, actuator, and sensor may be powered by the battery. In one embodiment, the battery is a rechargeable battery that is charging when the generator is driven by the turbine.

The generator provides a generated voltage 412. The generated voltage is provided to line conditioning circuitry 430. The components of the line conditioning depend upon the characteristics of the power grid (e.g., linefeed supply voltage level and type) as well as the characteristics of the generated voltage (e.g., voltage level and type).

In one embodiment, the generator is a d.c. generator and the power grid is an a.c. supply source. The line conditioning circuitry includes an inverter 434 to convert and step up the d.c. generated voltage to an a.c. linefeed compatible voltage 432. The line conditioning circuitry may also include filters 436 to aid in phase alignment and conditioning for linefeed compatibility. A synchronization signal 443 may be provided from a linefeed supply powering the forced-air device. The synchronization signal aids in phase alignment of the linefeed compatible voltage relative to the linefeed supply voltage.

The linefeed compatible voltage 432 is provided to the net meter. The net meter enables computation of a net power consumption. In one embodiment, the net meter offsets power consumed from one output (e.g., linefeed supply) by power provided to an input (e.g., linefeed compatible voltage) such that the meter provides the net power consumption. In another embodiment, the meter determines both the power consumed and the power generated to enable the electric service provider and the consumer to have knowledge of the underlying consumption and production amounts instead of only the net. This latter approach is preferable in an environment where there is not a watt-to-watt offset for production and consumption. This might be the case, for example, if there are different prices per kilowatt-hour for consumption and production or if there is a more sophisticated pricing scheme for the generated power.

Figure 5:
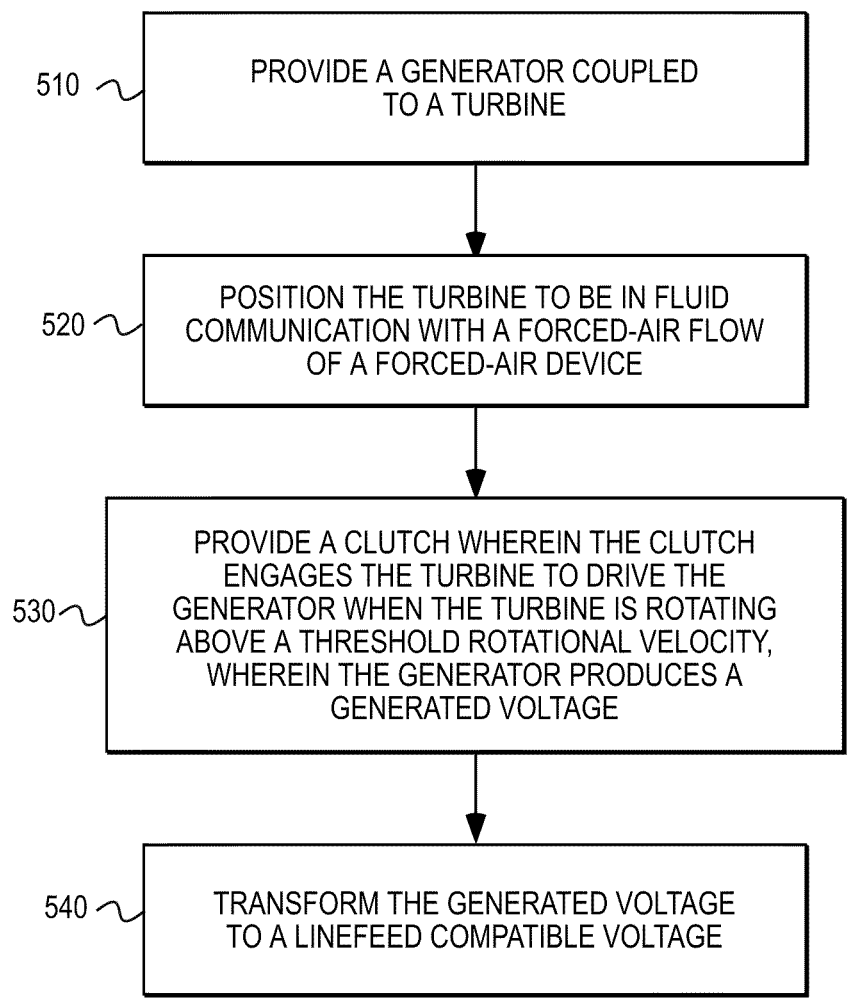
FIG. 5 illustrates one embodiment of a method of generating power from a forced-air electric generator.

FIG. 5 illustrates one embodiment of a method of generating electricity. In step 510, a generator coupled to a turbine is provided. In step 520, the turbine is positioned to be in fluid communication with a forced-air flow of a forced-air device. A clutch is provided in step 530, wherein the clutch engages the turbine to drive the generator when the turbine is rotating above a threshold rotational velocity, wherein the generator produces a generated voltage. The generated voltage is transformed to a linefeed compatible voltage in step 540.

In various embodiments, the linefeed compatible voltage has a same magnitude as a linefeed supply powering the forced-air device. Similarly, the linefeed compatible voltage may be synchronized to have a pre-determined phase relationship with the linefeed supply to the forced-air device. In various embodiments, the linefeed compatible voltage lags or leads the linefeed supply in phase. In one embodiment, the pre-determined phase relationship is approximately zero degrees such that the linefeed compatible voltage has a same phase as the linefeed supply to the forced-air device.

In the preceding detailed description, the invention is described with reference to specific exemplary embodiments thereof. A turbine apparatus and method for energy reclamation and generation of electrical power from forced-air systems is described. Various modifications and changes may be made thereto without departing from the broader scope of the invention as set forth in the claims. The specification and drawings are, accordingly, to be regarded in an illustrative rather than a restrictive sense.

What is claimed is:

1. A forced-air electric generator apparatus, comprising:
   a housing positioned to receive forced-air flow from a forced-air device, wherein the forced air is provided by an electrically powered fan of the forced-air device;
   a bladed rotor carried by the housing, wherein the bladed rotor is in fluid communication with the forced-air flow;
   a generator for converting mechanical energy to electrical energy; and
   a clutch, wherein the clutch engages the bladed rotor to drive the generator to produce a generated voltage when the bladed rotor is rotating above a threshold rotational velocity.

2. The apparatus of claim 1 further comprising:
   an inverter, wherein the inverter transforms the generated voltage to a linefeed compatible voltage.

3. The apparatus of claim 2 wherein the generated voltage is a d.c. voltage, wherein the inverter converts the d.c. voltage to an a.c. voltage having approximately a same magnitude as a linefeed supply.

4. The apparatus of claim 2 wherein the linefeed compatible voltage has a pre-determined phase relationship with a linefeed supply provided to power the forced-air device.

5. The apparatus of claim 4 wherein the linefeed compatible voltage leads the linefeed supply voltage in phase.

6. The apparatus of claim 4 wherein the linefeed compatible voltage lags the linefeed supply voltage in phase.

7. The apparatus of claim 4 wherein the pre-determined phase relationship is approximately zero.

8. The apparatus of claim 2 further comprising:
   a net meter coupled to meter power consumption at a premise including power consumed by the forced-air device, wherein the net meter is coupled to an output of the inverter, wherein the net meter computes at least one of i) an amount of power received from the inverter, and ii) a net amount of power used computed as a weighted difference between main power consumption and power received from the inverter.

9. The apparatus of claim 8 wherein main power consumption and power received from the inverter are given equal weight when computing a net amount of power.

10. The apparatus of claim 8 wherein main power consumption and power received from the inverter are given different weights when computing a net amount of power.

11. The apparatus of claim 1 wherein an axis of rotation of the bladed rotor forms an axial flow turbine.

12. The apparatus of claim 1 wherein the electrically powered fan is an air conditioner compressor convective cooling fan.

13. A method of generating electricity, comprising:
   a) providing a generator coupled to a turbine;
   b) positioning the turbine in fluid communication with forced air flow from a forced-air device, wherein the forced air flow is provided by an electrically powered fan of the forced-air device; and
   c) providing a clutch, wherein the clutch engages the turbine to drive the generator to produce a generated voltage when the turbine is rotating above a threshold rotational velocity.

14. The method of claim 13 wherein the electrically powered fan is an air conditioner compressor convective cooling fan.

15. The method of claim 13 further comprising:
   d) transforming the generated voltage to a linefeed compatible voltage.

16. The method of claim 15 wherein the generated voltage is a d.c. voltage, wherein the linefeed compatible voltage is an a.c. voltage, wherein the generated voltage is transformed to a linefeed compatible voltage having approximately a same magnitude as a linefeed supply providing power to the forced-air device.

17. The method of claim 15 wherein the linefeed compatible voltage has a pre-determined phase relationship with a linefeed supply providing power to the forced-air device.

18. The method of claim 17 wherein the linefeed compatible voltage leads the linefeed supply voltage in phase.

19. The method of claim 17 wherein the linefeed compatible voltage lags the linefeed supply voltage in phase.

20. The method of claim 17 wherein the pre-determined phase relationship is approximately zero.

* * * * *